(12) United States Patent
Hwang et al.

(10) Patent No.: US 9,213,432 B2
(45) Date of Patent: Dec. 15, 2015

(54) MOBILE DEVICE AND METHOD FOR OPERATING THE SAME

(71) Applicant: SAMSUNG DISPLAY CO., LTD., Yongin, Gyeonggi-Do (KR)

(72) Inventors: Hee-Chul Hwang, Yongin (KR); Joo-Hyung Lee, Yongin (KR); Eun-Gyeong Choe, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 66 days.

(21) Appl. No.: 13/936,944

(22) Filed: Jul. 8, 2013

(65) Prior Publication Data

US 2014/0210737 A1 Jul. 31, 2014

(30) Foreign Application Priority Data

Jan. 29, 2013 (KR) ........................ 10-2013-0009999

(51) Int. Cl.
*G06F 3/041* (2006.01)
*G06F 1/16* (2006.01)

(52) U.S. Cl.
CPC ............ *G06F 3/0412* (2013.01); *G06F 1/1616* (2013.01); *G06F 1/1641* (2013.01); *G06F 1/1643* (2013.01); *G06F 1/1677* (2013.01)

(58) Field of Classification Search
CPC .... G06F 1/1641; G06F 3/0412; G06F 1/1616
USPC .................................................. 345/156–184
See application file for complete search history.

(56) References Cited

U.S. PATENT DOCUMENTS

| | | | | |
|---|---|---|---|---|
| 7,636,071 B2 * | 12/2009 | O'Gorman | ..................... | 345/1.1 |
| 2007/0229660 A1 * | 10/2007 | Yamaguchi | ................... | 348/143 |
| 2007/0233425 A1 | 10/2007 | Fujiwara | | |
| 2009/0189829 A1 * | 7/2009 | Hiramatsu et al. | ............. | 345/1.3 |
| 2010/0182265 A1 | 7/2010 | Kim et al. | | |
| 2010/0298032 A1 | 11/2010 | Lee et al. | | |
| 2010/0302179 A1 * | 12/2010 | Ahn et al. | ..................... | 345/173 |
| 2011/0122107 A1 * | 5/2011 | Onkura | ........................ | 345/207 |
| 2011/0126141 A1 * | 5/2011 | King et al. | .................... | 715/769 |
| 2012/0272179 A1 * | 10/2012 | Stafford | ........................ | 715/781 |
| 2012/0299848 A1 * | 11/2012 | Homma et al. | ............... | 345/173 |

FOREIGN PATENT DOCUMENTS

| | | |
|---|---|---|
| KR | 10-2007-0099420 | 10/2007 |
| KR | 10-2010-0048747 | 5/2010 |
| KR | 10-2010-0082451 | 7/2010 |
| KR | 10-2010-0125938 | 12/2010 |

* cited by examiner

*Primary Examiner* — Carolyn R Edwards

(74) *Attorney, Agent, or Firm* — Christie, Parker & Hale, LLP

(57) ABSTRACT

A mobile device including a first display, a second display, a foldable coupling portion for coupling the first display to the second display, an angle sensing unit for sensing a folding angle between the first display and the second display, a direction-of-sight sensing unit for sensing a direction of sight of a user, and a controller for determining whether to use a touch input sensed by either the first display or the second display based on the sensed folding angle and the sensed direction of sight.

13 Claims, 5 Drawing Sheets

MOBILE DEVICE AND METHOD FOR OPERATING THE SAME

RELATED APPLICATIONS

This application claims priority to and the benefit of Korean Patent Application No. 10-2013-0009999, filed on Jan. 29, 2013, in the Korean Intellectual Property Office, the entire content of which is incorporated herein by reference.

BACKGROUND

1. Field

An aspect of an embodiment of the present invention relates to a mobile device and a method for operating the same.

2. Description of the Related Art

A recent mobile device recognizes a user's touch input using a touch screen panel located on a display area, and performs various operations according to coordinate information of the recognized touch input. However, a related art mobile device also recognizes a user's unintended touch input as a valid input, and therefore, an unintended operation may be performed.

Meanwhile, a foldable mobile device, e.g., a mobile device having a plurality of displays coupled to each other and having a foldable coupling portion, can further improve mobility as compared with mobile devices with other structures, and can further perform various applications. Accordingly, the mobile device is widely used in various fields.

In the foldable mobile device, it is possible that a user's unintentional touch input may be applied to a touch screen panel, as compared with mobile devices with other structures. For example, when an e-book application is executed in a foldable mobile device, a user may hold the foldable mobile device as if the user held a general book. Accordingly, the mobile device may perform a user's unintentional operation by recognizing a user's finger touched on a touch screen panel as a touch input.

To improve user's convenience by preventing such malfunction of the mobile device, it is required to develop a technique for deciding whether a touch input is applied to the mobile device according to user's intention.

SUMMARY

Embodiments provide a mobile device including a plurality of displays coupled to each other and having a foldable coupling portion and a method for operating the mobile device, which can decide whether a user's touch input is activated based on a folding angle between the plurality of displays and a direction of user's sight.

According to an embodiment of the present invention, there is provided a mobile device including a first display, a second display, a foldable coupling portion for coupling the first display to the second display, an angle sensing unit for sensing a folding angle between the first display and the second display, a direction-of-sight sensing unit for sensing a direction of sight of a user, and a controller for determining whether to use a touch input sensed by either the first display or the second display based on the sensed folding angle and the sensed direction of sight.

The first display may include a first microelectromechanical systems (MEMS) sensor, the second display may include a second MEMS sensor, and the angle sensing unit may include a first angle calculation unit for calculating and outputting a first angle value corresponding to a first angle between the first display and the ground based on first acceleration vectors output from the first MEMS sensor, a second angle calculation unit for calculating and outputting a second angle value corresponding to a second angle between the second display and the ground based on second acceleration vectors output from the second MEMS sensor, and a folding angle calculation unit for calculating the folding angle based on the first angle value and the second angle value.

The mobile device may further include an image recognition device for outputting image data, and the direction-of-sight sensing unit may include a contour extraction unit for extracting information corresponding to a face area and an eye area from the image data, and a direction-of-sight calculation unit for calculating the direction of sight of the user according to coordinate values of the face area and the eye area.

The direction-of-sight sensing unit may further include an image conversion unit for extracting a luminance element from the image data, and the contour extraction unit may be configured to extract the information corresponding to the face area and the eye area from the luminance element.

The controller may be configured to predict whether the sensed touch input is intended based on the sensed folding angle, the sensed direction of sight, and a coordinate value of the touch input, and may be configured to output a control signal as a result thereof.

The controller may predict that the touch input was unintended when the folding angle and the direction of sight are within a range.

The controller may predict that the touch input was intended when the direction of sight corresponds to the coordinate value of the touch input.

According to another embodiment of the present invention, there is provided a method for operating a mobile device including a first display coupled to a second display by a foldable coupling portion, the method including sensing a folding angle between the first display and the second display, sensing a direction of sight of a user, and controlling whether a touch input sensed by the first display or the second display is used based on the folding angle and the direction of sight.

The sensing of the folding angle may include calculating a first angle between the first display and the ground, calculating a second angle between the second display and the ground, and calculating the folding angle based on the first angle and the second angle.

Calculating the first angle may include analyzing first acceleration vectors output from a first MEMS sensor of the first display, and calculating the second angle may include analyzing second acceleration vectors output from a second MEMS sensor of the second display.

The sensing of the direction of sight may include extracting information corresponding to a face area and an eye area from image data output from an image recognition device, and calculating the direction of sight according to coordinate values of the face area and the eye area.

The extracting information corresponding to the face area and the eye area may include extracting a luminance element from the image data, and extracting the information corresponding to the face area and the eye area from the luminance element.

The controlling whether the touch input sensed by the first display or the second display is used may include deciding whether the touch input was intended by the user based on the folding angle, the direction of sight of the user, and a coordinate value of the touch input, and determining whether to perform a command corresponding to the touch input according to a result of the decision.

The deciding whether the touch input was intended by the user may include deciding that the touch input was unintended when the folding angle and the direction of sight are each within a corresponding range.

The deciding whether the touch input was intended by the user may include deciding that the touch input was intended when the direction of sight corresponds to the coordinate value of the touch input.

In the mobile device and the method for operating the same according to embodiments of the present invention, it is possible to decide whether a user's touch input is intended based on a folding angle between a plurality of displays and a direction of user's sight.

BRIEF DESCRIPTION OF THE DRAWINGS

The accompanying drawings, together with the specification, illustrate exemplary embodiments of the present invention, and, together with the description, serve to explain the aspects of embodiments of the present invention.

DETAILED DESCRIPTION

Figure 1:
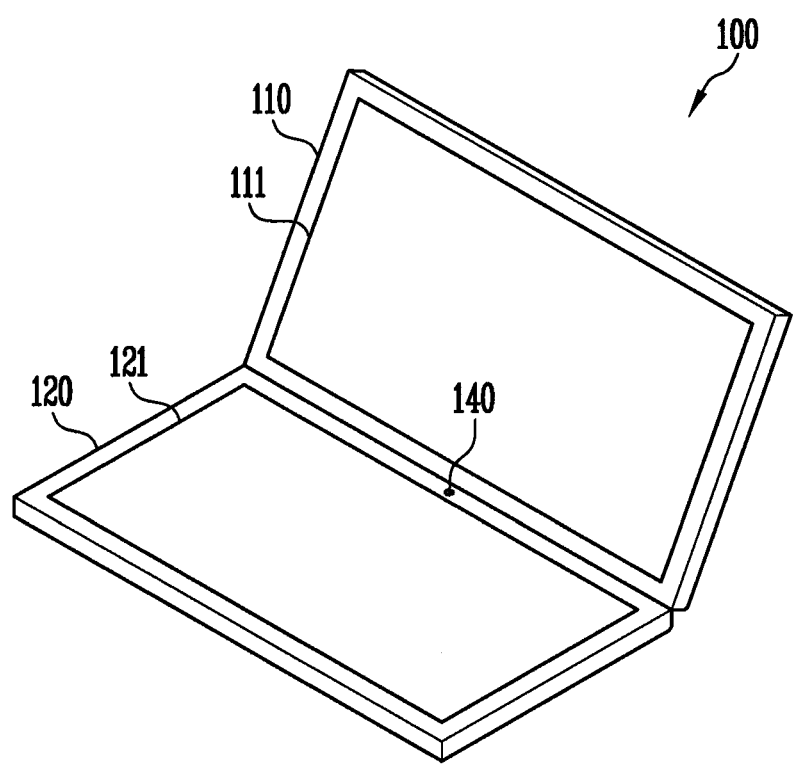
FIG. 1 is a conceptual view illustrating a mobile device according to an embodiment of the present invention.

Hereinafter, certain exemplary embodiments of the present invention will be described with reference to the accompanying drawings. Here, when a first element is described as being coupled to a second element, the first element may be directly coupled to the second element, and may also be indirectly coupled to the second element via one or more other elements. Further, some of the elements that are not essential to the complete understanding of the invention may be omitted for clarity. Also, like reference numerals refer to like elements throughout.

Figure 2:
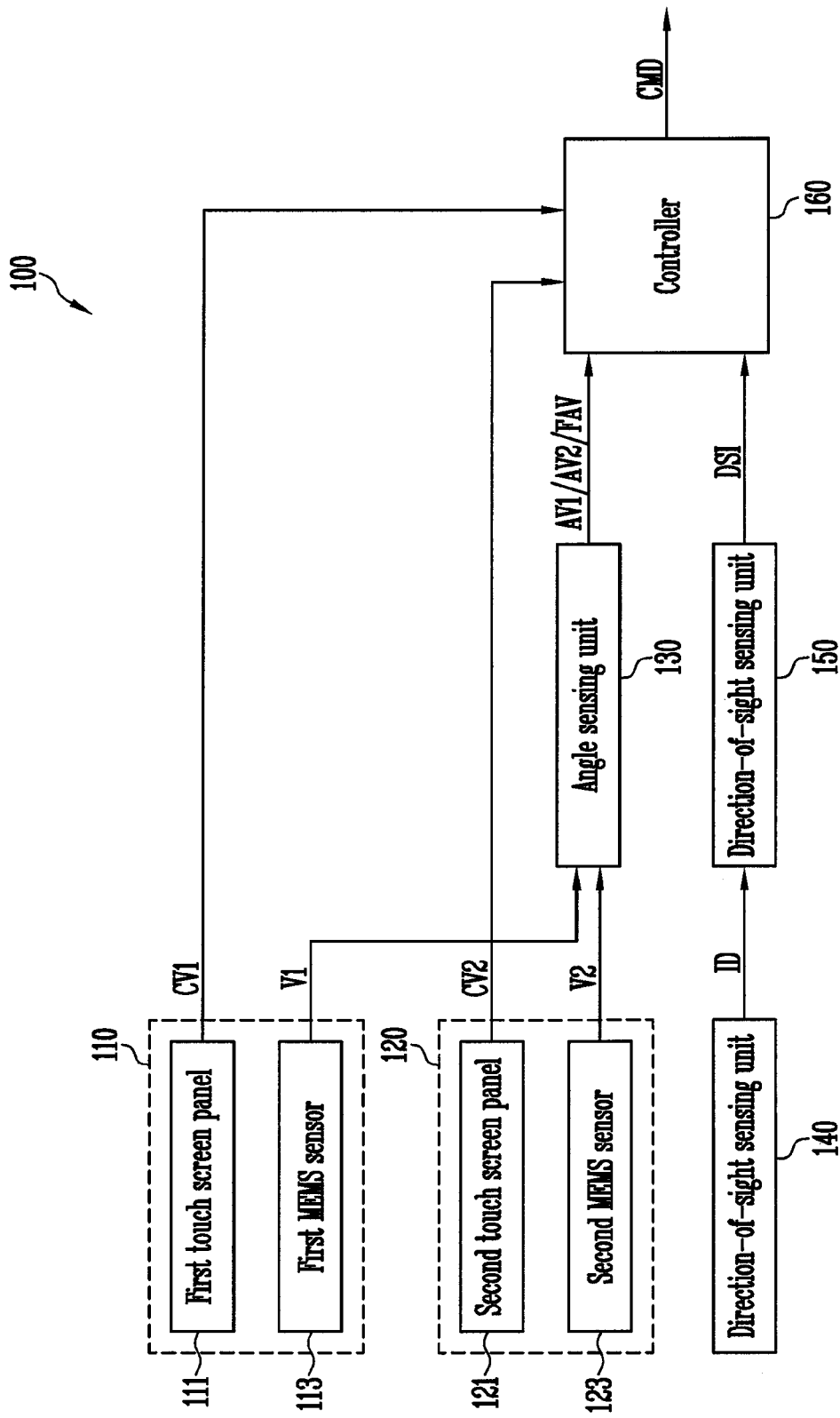
FIG. 2 is a block diagram corresponding to the mobile device shown in FIG. 1.
Figure 3:
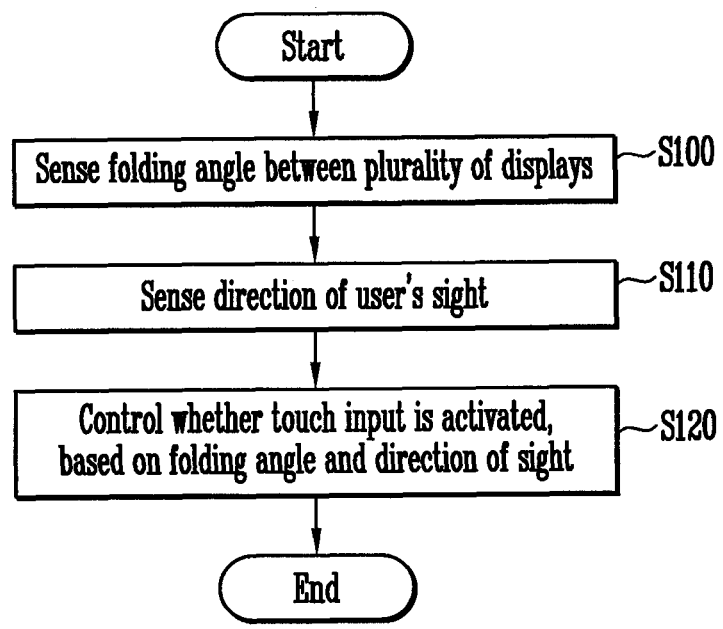
FIG. 3 is a flowchart illustrating a method for operating the mobile device shown in FIG. 1.
Figure 4:
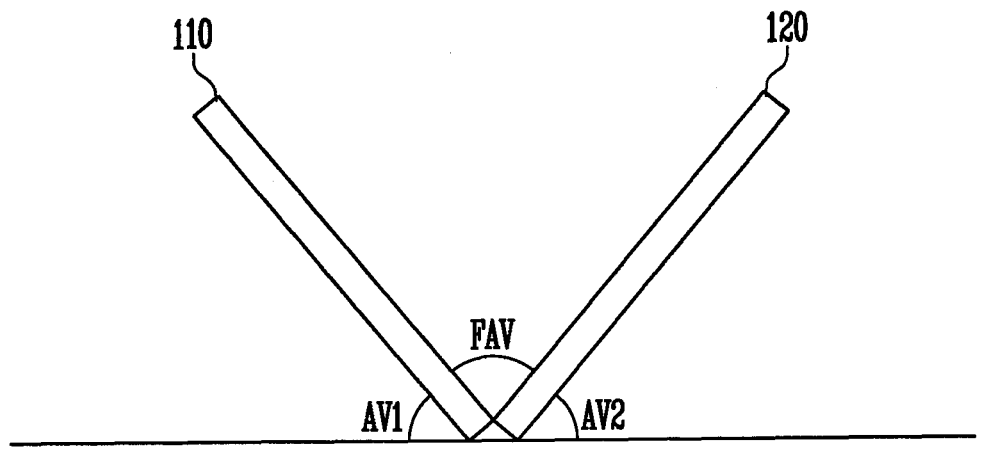
FIG. 4 is a view illustrating a relationship among a first angle between a first display of the mobile device shown in FIG. 1 and the ground, a second angle between a second display of the mobile device shown in FIG. 1 and the ground, and a folding angle between the first and second displays.

FIG. 1 is a conceptual view illustrating a mobile device according to an embodiment of the present invention. FIG. 2 is a block diagram corresponding to the mobile device shown in FIG. 1. FIG. 3 is a flowchart illustrating a method for operating the mobile device depicted in FIG. 2. FIG. 4 is a view illustrating a relationship among a first angle between a first display of the mobile device shown in FIG. 1 and the ground, a second angle between a second display of the mobile device shown in FIG. 1 and the ground, and a folding angle between the first and second displays. Referring to FIGS. 1 to 4, the mobile device 100 of the present embodiment includes a plurality of displays 110 and 120 coupled to each other and having a foldable coupling portion.

Touch screen panels 111 and 121 are located on display areas of the plurality of displays 110 and 120, respectively. For example, the first touch screen panel 111 is located on the display area of the first display 110, and the second touch screen panel 121 is located on the display area of the second display 120.

The first touch screen panel 111 senses a user's touch input on the display area of the first display 110, and outputs a first coordinate value CV1 of the sensed touch input to a controller 160. The second touch screen panel 121 senses a user's touch input on the display area of the second display 120, and outputs a second coordinate value CV2 of the sensed touch input to the controller 160.

Microelectromechanical system (MEMS) sensors 113 and 123 are located in the plurality of displays 110 and 120, respectively. For example, the first MEMS sensor 113 is located in the first display 110, and the second MEMS sensor 123 is located in the second display 120.

The MEMS sensor 113 or 123 may be implemented as a sensor capable of sensing an operation of the display 110 or 120, such as, for example, an acceleration sensor, terrestrial magnetism sensor, or gyro sensor. In the present embodiment, the MEMS sensor 113 or 123 is a three-axis acceleration sensor, although the present invention is not limited thereto.

The first MEMS sensor 113 senses a change in acceleration of the first display 110, and outputs first acceleration vectors V1, which correspond to the sensed change, to an angle sensing unit 130. The second MEMS sensor 123 senses a change in acceleration of the second display 110, and outputs second acceleration vectors V2, which correspond to the sensed change, to the angle sensing unit 130.

The angle sensing unit 130 calculates a first angle (e.g., corresponding to a first angle value AV1) between the first display 110 and the ground, a second angle (e.g., corresponding to a second angle value AV2) between the second display 120 and the ground, and a folding angle between the first and second displays 110 and 120, based on the first acceleration vectors V1 and the second acceleration vectors V2 (S100 of FIG. 3). In the present embodiment, the angle sensing unit 130 senses the first angle based on the first acceleration vectors V1, and senses the second angle based on the second acceleration vectors V2. The angle sensing unit 130 calculates the folding angle based on the first and second angles (S100).

According to an embodiment of the present invention, the angle sensing unit 130 may calculate the first angle based on the first acceleration vectors V1, and may calculate the second angle based on the second acceleration vectors V2, using a trigonometric function.

According to another embodiment, the angle sensing unit 130 may read, from a memory, the first angle value AV1, the second angle value AV2, and a folding angle value FAV, corresponding to the first acceleration vectors V1 and the second acceleration vectors V2.

For example, the angle sensing unit 130 may sense three-axis angles of the first display 110 (e.g., angles of X, Y, and Z axes) based on the first acceleration vectors V1, and may sense three-axis angles of the second display 120 based on the second acceleration vectors V2, thereby reading from the memory a first angle value AV1, a second angle value AV2, and a folding angle value FAV, corresponding to the three-axis angles of the first display 110 and the three-axis angles of the second display 120.

The following table Table 1 shows examples of the three-axis angles of each of the displays 110 and 120, the first angle value AV1, the second angle value AV2, and the folding angle value FAV, which correspond to the three-axis angles stored in the memory according to an embodiment of the present invention.

TABLE 1

| Three-axis angles of first display | | | | Three-axis angles of second display | | | | |
|---|---|---|---|---|---|---|---|---|
| X-axis | Y-axis | Z-axis | AV1 | X-axis | Y-axis | Z-axis | AV2 | FAV |
| 0 | 0 | −90 | 180 | 0 | 0 | 90 | 0 | 0 |
| 0 | −45 | −45 | 135 | 0 | 0 | 90 | 0 | 45 |
| 0 | −90 | 0 | 90 | 0 | 0 | 90 | 0 | 90 |
| 0 | −45 | 45 | 45 | 0 | 0 | 90 | 0 | 135 |
| 0 | 0 | 90 | 0 | 0 | 0 | 90 | 0 | 180 |
| 0 | −45 | 45 | 90 | 0 | 45 | 45 | 0 | 90 |
| 0 | −23 | 67 | 135 | 0 | 23 | 67 | −45 | 135 |
| −45 | −0 | 90 | 180 | 0 | 0 | 90 | −90 | 180 |
| −45 | −30 | 30 | 45 | −45 | 30 | 30 | 0 | 90 |
| −45 | −15 | 38 | 90 | −45 | 15 | 38 | −45 | 135 |
| −45 | 0 | 45 | 135 | −45 | 0 | 45 | −90 | 180 |

Figure 5:
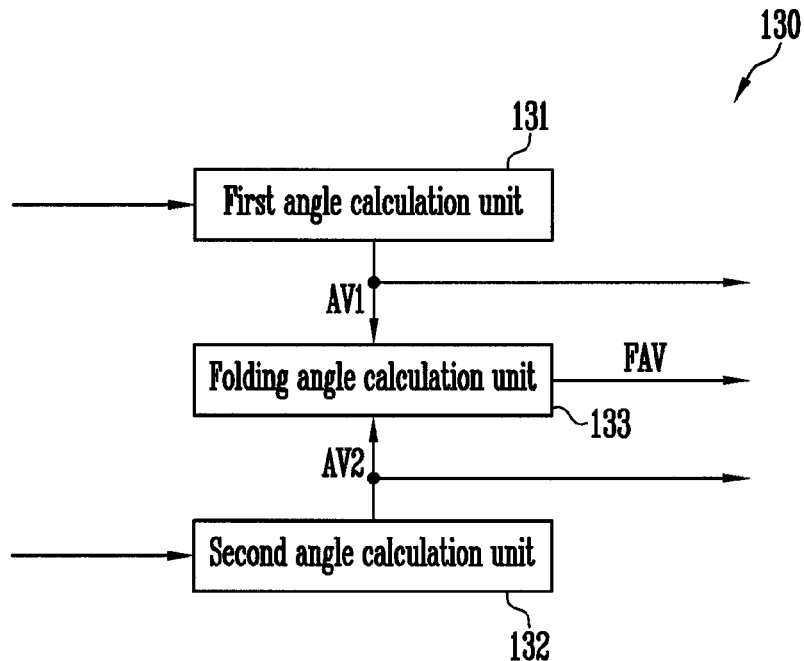
FIG. 5 is a block diagram corresponding to an angle sensing unit referred to in FIG. 2.
Figure 6:
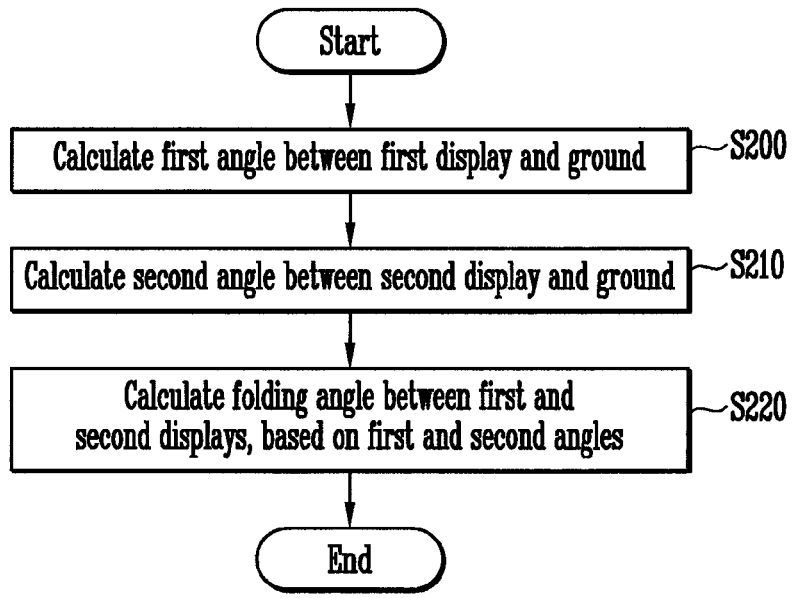
FIG. 6 is a flowchart illustrating a method in which the angle sensing unit referred to in FIG. 2 calculates a folding angle between a plurality of displays.

FIG. 5 is a block diagram corresponding to the angle sensing unit shown in FIG. 2. FIG. 6 is a flowchart illustrating a method in which the angle sensing unit shown in FIG. 2 calculates a folding angle between a plurality of displays. Referring to FIGS. 5 and 6, the angle sensing unit 130 of the present embodiment includes a first angle calculation unit 131, a second angle calculation unit 132, and a folding angle calculation unit 133.

The first angle calculation unit 131 calculates a first angle between the first display 110 and the ground based on the first acceleration vectors V1 output from the first MEMS sensor 113, and outputs the calculated first angle as a first angle value AV1 to the folding angle calculation unit 133 and the controller 160 (S200).

The second angle calculation unit 132 calculates a second angle between the second display 120 and the ground based on the second acceleration vectors V2 output from the second MEMS sensor 123, and outputs the calculated second angle as a second angle value AV2 to the folding angle calculation unit 133 and the controller 160 (S210).

The folding angle calculation unit 133 calculates a folding angle between the first and second displays 110 and 120 based on the first angle value AV1 and the second angle value AV2, and outputs the calculated folding angle as a folding angle value FAV to the controller 160 (S220).

In the present embodiment, an image recognition device 140 may be located in the mobile device 100. To precisely sense a direction of user's sight, the image recognition device 140 (shown in FIG. 1) may be located in the vicinity of the coupling portion at which the plurality of displays 110 and 120 are coupled to each other, although the present invention is not limited thereto.

Figure 8:
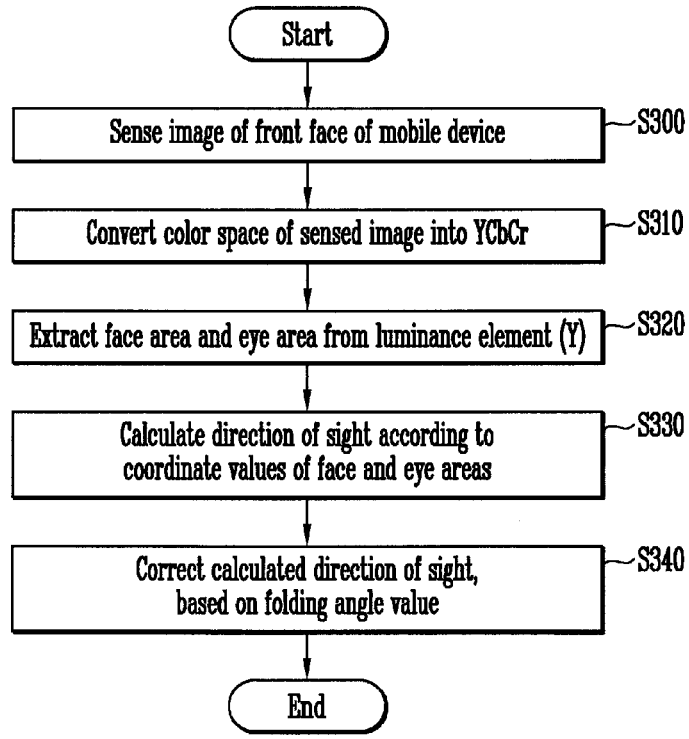
FIG. 8 is a flowchart illustrating a method in which the direction-of-sight sensing unit referred to in FIG. 2 senses a direction of user's sight.

The image recognition device 140 senses an image of the user's face in front of the mobile device 100, and outputs the sensed image as an image data ID to a direction-of-sight sensing unit 150 (S300 of FIG. 8). The image recognition device 140 may be, for example, an image sensor such as a camera.

The direction-of-sight sensing unit 150 senses a direction of the user's sight by analyzing the image data ID output from the image recognition device 140, and outputs the sensed direction as direction-of-sight information DSI to the controller 160. Specifically, the direction-of-sight sensing unit 150 (FIG. 7) extracts information corresponding to a face area and an eye area from the image data ID, and calculates the direction of sight according to coordinate values corresponding to the face and eye areas.

Figure 7:
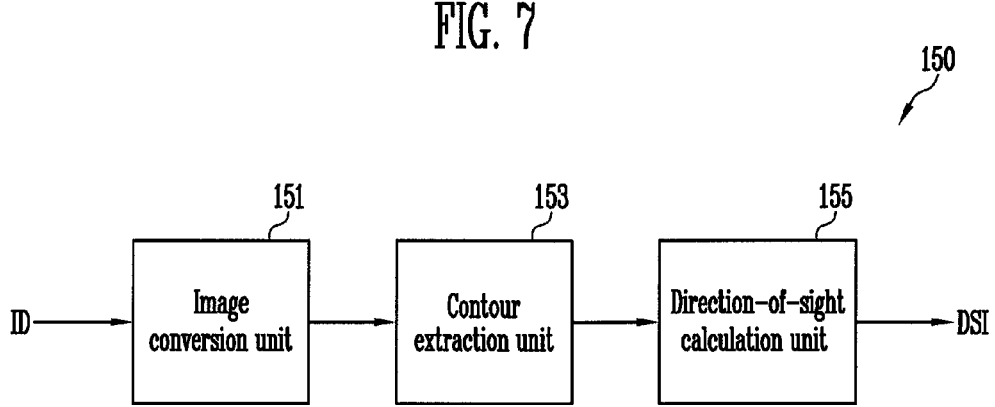
FIG. 7 is a block diagram corresponding to a direction-of-sight sensing unit referred to in FIG. 2.

FIG. 7 is a block diagram corresponding to the direction-of-sight sensing unit shown in FIG. 2. FIG. 8 is a flowchart illustrating a method in which the direction-of-sight sensing unit shown in FIG. 2 senses a direction of user's sight. Referring to FIGS. 7 and 8, the direction-of-sight sensing unit 150 includes a contour extraction unit 153 and a direction-of-sight calculation unit 155.

The contour extraction unit 153 extracts information corresponding to a face area and an eye area (e.g., a face area of a user and an eye area of the user) from an image data ID. For example, the contour extraction unit 153 extracts the information corresponding to the face area and the eye area through edge detection (S320).

The direction-of-sight calculation unit 155 may calculate a direction of user's sight according to coordinate values of the information corresponding to the face and eye areas extracted by the contour extraction unit 153. The direction-of-sight sensing unit 150 may further include an image conversion unit 151.

The image conversion unit 151 of the present embodiment converts a color space of the image data output from the image recognition device 140. For example, the image conversion unit 151 converts RGB data output from the image recognition device 140 into YCbCr data, extracts a luminance element (Y) from the converted YCbCr data, and outputs the extracted luminance element (Y) to the contour extraction unit 153 (S310). In the present embodiment, the contour extraction unit 153 extracts the face area and the eye area from the luminance element (Y) output from the image conversion unit 151 (S320).

When the folding angle between the first and second displays 110 and 120 is changed, it is possible that the direction of user's sight may be meaningless (e.g., unusable) regardless of user's intention. Thus, the direction-of-sight calculation unit 155 may not be able to sense the direction of sight depending on the folding angle value FAV.

When viewing a display for the first time, the user generally views the front face of the display. Therefore, the direction-of-sight calculation unit 155 may determine coordinate values of first detected face and eye areas as reference values, and may calculate the direction of user's sight based on differences between the reference values and coordinates values of subsequently detected face and eye areas.

The direction-of-sight sensing unit 150 may correct, or adjust, the sensed direction of sight according to the folding angle value FAV output from the angle sensing unit 130. Specifically, the direction-of-sight sensing unit 150 may read the sensed direction and direction-of-sight information DSI corresponding to the folding angle value FAV from the memory, and may output them to the controller 160 (S340).

Meanwhile, according to an embodiment of the present invention, the controller 160 controls whether the user's touch input to the plurality of displays 110 and 120 is used based on the folding angle value FAV output from the angle sensing unit 130 and the direction-of-sight information DSI output from the direction-of-sight sensing unit 150.

Specifically, the controller 160 decides whether the user's touch input is input according to user's intention (e.g., the controller 160 decides whether the touch input is intended by the user) based on the folding angle value FAV and the direction-of-sight information DSI. When it is decided that the touch input has been input according to the user's intention, the controller 160 may output a control signal (CMD), which corresponds to the coordinate value CV1 or CV2 of the touch input, to, for example, a processor of the mobile terminal.

For example, when the folding angle and the direction of sight are within a range (e.g., a predetermined range), the controller 160 may decide that the touch input was either intended (or, alternatively, unintended) to be input by the user. To this end, the controller 160 may include a memory that stores folding angles for activating the touch input and data on a range of the direction of sight.

According to another embodiment of the present invention, the controller 160 may decide whether the touch input is activated (e.g., is used, or is input) based on the first angle value AV1 and the second angle value AV2 as well as the folding angle value FAV and the direction-of-sight information DSI.

For example, if a user holds the mobile device 100 in a manner one would hold a general book, an unintentional touch input may occur. Thus, when the folding angle value, the direction of sight, the first angle value, and the second angle value are each within a corresponding range (e.g., a predetermined range), the touch input can be non-activated (e.g., blocked, disregarded, not used, etc.), thereby preventing malfunction of the mobile device 100.

According to another embodiment of the present invention, the controller 160 may decide whether the touch input is activated based on the direction-of-sight information DSI and the coordinate value CV1 or CV2 of the touch input. Generally, the direction of user's sight might not correspond to the user's intentional touch input. Thus, the controller 160 can activate a touch input when the direction of sight corresponds to the coordinate value of the touch input.

While embodiments of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A mobile device comprising:
a first display;
a second display;
a foldable coupling portion for coupling the first display to the second display;
an angle sensing unit for sensing a folding angle between the first display and the second display;
a direction-of-sight sensing unit for sensing a direction of sight of a user; and
a controller configured to receive an indication that a touch input is sensed by either the first display or the second display, to determine whether or not to use the touch input sensed by either the first display or the second display based on the sensed folding angle and the sensed direction of sight, and to disregard the touch input in response to determining not to use the touch input; and
an image recognition device for outputting image data,
wherein the direction-of-sight sensing unit comprises:
a contour extraction unit for extracting information corresponding to a face area and an eye area from the image data; and
a direction-of-sight calculation unit for calculating the direction of sight of the user according to coordinate values of the face area and the eye area,
wherein the direction-of-sight calculation unit disregards the direction of sight when the folding angle between the first and second displays is changed.

2. The mobile device of claim 1, wherein the first display comprises a first microelectromechanical systems (MEMS) sensor,
wherein the second display comprises a second MEMS sensor, and wherein the angle sensing unit comprises:
a first angle calculation unit for calculating and outputting a first angle value corresponding to a first angle between the first display and the ground based on first acceleration vectors output from the first MEMS sensor;
a second angle calculation unit for calculating and outputting a second angle value corresponding to a second angle between the second display and the ground based on second acceleration vectors output from the second MEMS sensor; and
a folding angle calculation unit for calculating the folding angle based on the first angle value and the second angle value.

3. The mobile device of claim 1, wherein the direction-of-sight sensing unit further comprises an image conversion unit for extracting a luminance element from the image data, and
wherein the contour extraction unit is configured to extract the information corresponding to the face area and the eye area from the luminance element.

4. The mobile device of claim 1, wherein the controller is configured to predict whether the sensed touch input is intended based on the sensed folding angle, the sensed direction of sight, and a coordinate value of the touch input, and is configured to output a control signal as a result thereof.

5. The mobile device of claim 4, wherein the controller predicts that the touch input was unintended when the folding angle and the direction of sight are within a range.

6. The mobile device of claim 4, wherein the controller predicts that the touch input was intended when the direction of sight corresponds to the coordinate value of the touch input.

7. A method for operating a mobile device comprising a first display coupled to a second display by a foldable coupling portion, the method comprising:
sensing a folding angle between the first display and the second display;
sensing a direction of sight of a user;
sensing a touch input by either the first display or the second display;
determining, by a controller, whether or not to use the touch input sensed by the first display or the second display based on the folding angle and the direction of sight; and
disregarding the touch input in response to determining not to use the touch input,
wherein the sensing of the direction of sight comprises:
extracting information corresponding to a face area and an eye area from image data output from an image recognition device; and
calculating the direction of sight according to coordinate values of the face area and the eye area,
wherein the direction of sight is disregarded when the folding angle between the first and second displays is changed.

8. The method of claim 7, wherein the sensing of the folding angle comprises:
calculating a first angle between the first display and the ground;
calculating a second angle between the second display and the ground; and
calculating the folding angle based on the first angle and the second angle.

9. The method of claim 8, wherein calculating the first angle comprises analyzing first acceleration vectors output from a first MEMS sensor of the first display, and wherein calculating the second angle comprises analyzing second acceleration vectors output from a second MEMS sensor of the second display.

10. The method of claim 7, wherein the extracting information corresponding to the face area and the eye area comprises:
  extracting a luminance element from the image data; and
  extracting the information corresponding to the face area and the eye area from the luminance element.

11. The method of claim 7, wherein the controlling whether the touch input sensed by the first display or the second display is used comprises:
  deciding whether the touch input was intended by the user based on the folding angle, the direction of sight of the user, and a coordinate value of the touch input; and
  determining whether to perform a command corresponding to the touch input according to a result of the decision.

12. The method of claim 11, wherein the deciding whether the touch input was intended by the user comprises deciding that the touch input was unintended when the folding angle and the direction of sight are each within a corresponding range.

13. The method of claim 11, wherein the deciding whether the touch input was intended by the user comprises deciding that the touch input was intended when the direction of sight corresponds to the coordinate value of the touch input.

* * * * *